United States Patent [19]
Yabe et al.

[11] Patent Number: 5,163,124
[45] Date of Patent: Nov. 10, 1992

[54] METHOD AND APPARATUS FOR CONTROLLING POWER TO DEVICE IN A COMPUTER SYSTEM

[75] Inventors: Yasuji Yabe, Tenri; Yoshiyuki Fujikawa, Nara, both of Japan

[73] Assignee: Sharp Kabushiki Kaisha, Osaka, Japan

[21] Appl. No.: 685,987

[22] Filed: Apr. 15, 1991

Related U.S. Application Data

[63] Continuation of Ser. No. 524,706, May 17, 1990, abandoned, which is a continuation of Ser. No. 255,382, Oct. 11, 1988, abandoned.

[30] Foreign Application Priority Data

Oct. 14, 1987 [JP] Japan ............... 62-260192

[51] Int. Cl.⁵ ............... G06F 3/14; G06F 13/12
[52] U.S. Cl. ............... 395/750; 364/238.2; 364/273.3; 364/234.2; 364/286.2
[58] Field of Search ... 364/200 MS File, 900 MS File; 395/750

[56] References Cited

U.S. PATENT DOCUMENTS

| | | | |
|---|---|---|---|
| 4,204,249 | 5/1980 | Due | 364/492 |
| 4,403,303 | 9/1983 | Howes et al. | 364/900 |
| 4,443,861 | 4/1984 | Slater | 364/492 |
| 4,611,289 | 9/1986 | Coppola | 364/492 |
| 4,631,418 | 12/1986 | Toyomura | 364/900 |
| 4,663,539 | 5/1987 | Sharp et al. | 364/200 |
| 4,667,289 | 5/1987 | Yoshida et al. | 364/200 |
| 4,674,031 | 6/1987 | Siska | 364/900 |
| 4,677,566 | 6/1987 | Whittaker et al. | 364/492 |
| 4,747,041 | 5/1988 | Engel | 364/707 |
| 4,809,163 | 2/1989 | Hirosawa et al. | 364/200 |
| 4,907,183 | 3/1990 | Tanaka | 364/900 |

FOREIGN PATENT DOCUMENTS

0172344 2/1986 European Pat. Off. .
62-143518 6/1987 Japan .

OTHER PUBLICATIONS

Electronics vol. 61, No. 9, 28th Apr. 1988, pp. 103–104, N.Y., US; J. McLeod: "This laptop has the power of an 80386-based PC" *p. 103.

Primary Examiner—Lawrence E. Anderson

[57] ABSTRACT

A personal portable computer system includes peripheral devices such as a printer and a CRT which can be driven by a battery power source. The computer system includes a computer body which contains interface units and power supplied to the interface units is controlled. The interface units are used for supplying power to the peripheral devices.

8 Claims, 4 Drawing Sheets

METHOD AND APPARATUS FOR CONTROLLING POWER TO DEVICE IN A COMPUTER SYSTEM

This application is a continuation of application Ser. No. 07/524,706 filed on May 17, 1990 now abandoned, which is a continuation of granparent application Ser. No. 07/255,382 filed on Oct. 11, 1988 now abandoned.

BACKGROUND OF THE INVENTION

1. Field of the Invention

The present invention is directed to a method of supplying electric power to several peripheral devices in a computer system the computer system can include a computer body and several perpherial devices. The computer body contains interface units and a power supply to the interface units is controlled. The interface units are for use by the peripheral devices.

2. Description of the Prior Art

In a personal computer system, a personal computer is generally connected to a plurality of peripheral devices, for example, a CRT display, a MODEM and the like. When such a computer system is driven by an AC power source, there is no problem even if the system is supplied with electricity at all times whether in use or not. Personal computers are portable and are becoming more compact every year. At present, there is an increased demand to use a personal computer anywhere, resulting in the necessity of driving the computer system with a battery power source.

A conventional computer system is always supplied with electricity irrespective of the use of peripheral devices as it is generally driven by an AC power source. Even in a computer system driven by a battery, the peripheral devices are always supplied with electricity after the system has been turned on, resulting in the unnecessary consumption of the battery which is a disadvantage of this type of power supply in computers.

SUMMARY OF THE INVENTION

Accordingly, the present invention has been developed with a view to substantially eliminating the above described disadvantage inherent in the prior art computer system in which a plurality of peripheral devices connected thereto and are driven by a battery power source provided in a computer body.

The present invention, therefore, has for one of its objects a method of controlling power to the devices in a computer system in which the device or devices to be used are selectively supplied with electric power so that a battery power source accommodated in a computer body may be effectively used. The devices can be the peripheral devices of the computer such as a CRT display, a modem or the like.

In accomplishing this and other objects, the method of the present invention of controlling device power in a computer system includes the steps of:

displaying SET-UP menu data information for setting operating conditions of the devices, said information including a device selection item;

selecting any desired device or devices in accordance with the device selection item; and supplying electric power to the selected device or devices.

Accordingly, the peripheral devices to be used are initially selected by making reference to the SET-UP menu information at the time the computer system is powered on. Only one or more selected devices are then supplied with electric power, thus preventing unnecessary battery power consumption.

BRIEF DESCRIPTION OF THE DRAWINGS

This and other objects and features of the present invention will become more apparent from the following description taken in conjunction with the preferred embodiment thereof with reference to the accompanying drawings. In the drawing like parts are designated by like reference numerals, and in which.

DETAILED DESCRIPTION OF THE PREFERRED EMBODIMENT

Figure 1:
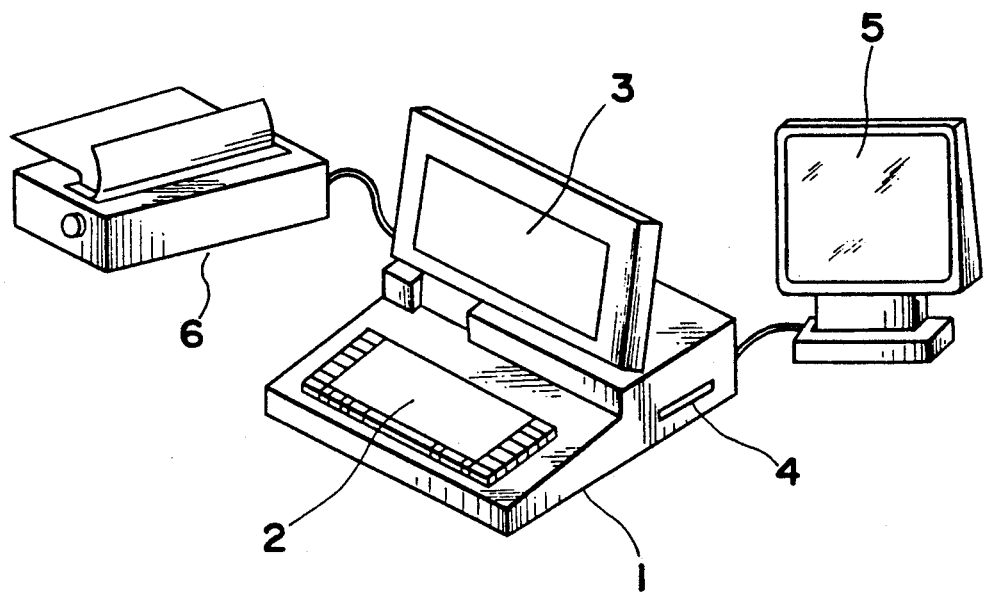
FIG. 1 is a perspective view of a computer system according to the present invention.

Referring first to FIG. 1, a computer system according to one preferred embodiment of the present invention includes a portable personal computer body 1 to which several peripheral devices, for example, a CRT display 5, a printer 6 and a telephone circuit (not shown) are connected through respective connector cables. The computer body 1 is provided with a keyboard 2, a liquid crystal display unit 3 and a floppy disc 4 detachably mounted therein. The keyboard 2 is provided with a plurality of alphanumeric keys, a function key or the like.

The peripheral devices to be used can be selected by the keyboard 2 or through software processing so that unused devices will not be operated unless desired.

The computer body 1 accommodates a control unit for controlling the peripheral devices and is driven by either an AC power source or a secondary power source which is a battery.

Figure 2:
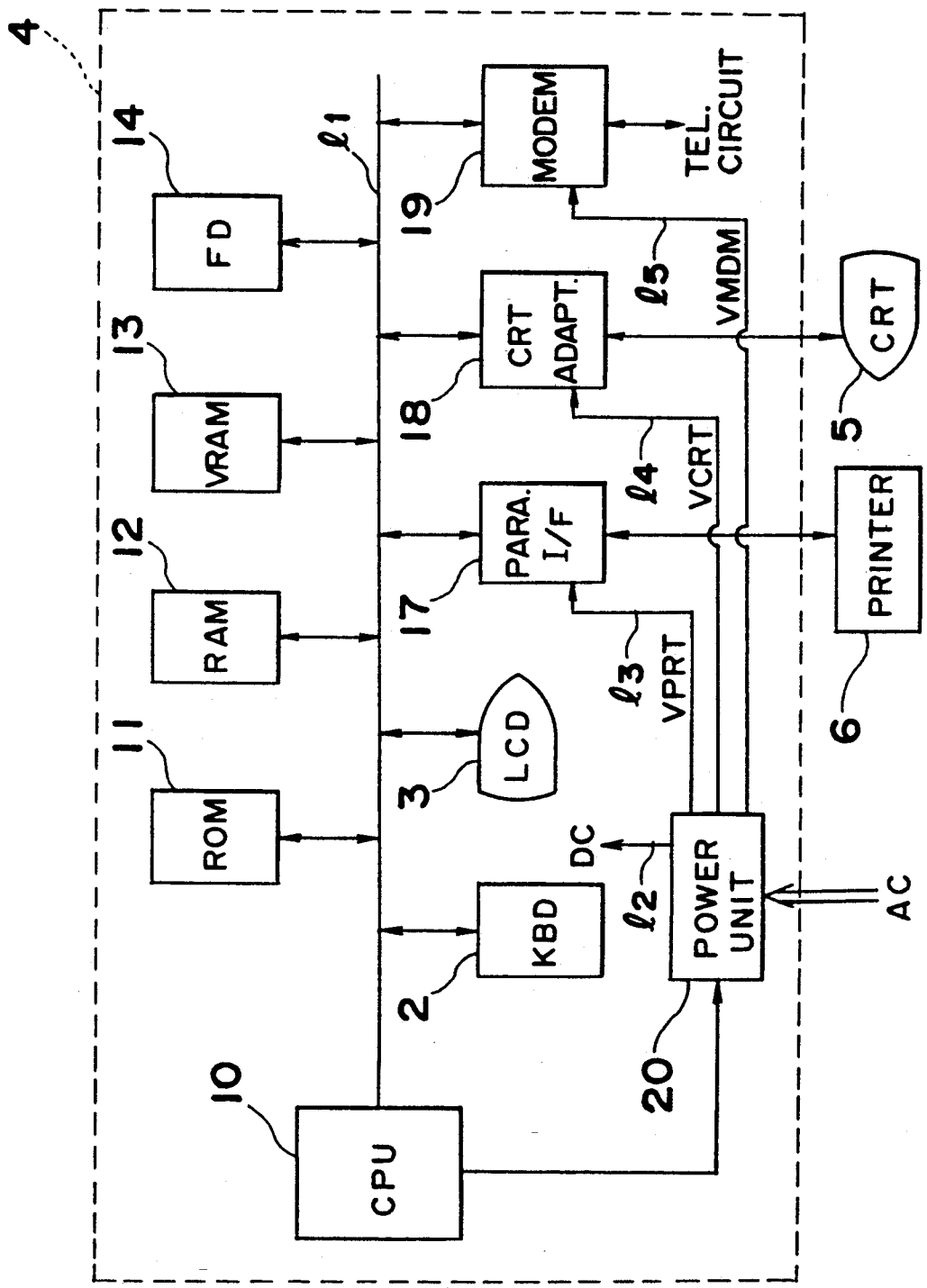
FIG. 2 is a block diagram showing a circuit of the system of FIG. 1.

FIG. 2 depicts a block diagram of the system of FIG. 1.

In the block diagram of FIG. 2, a CPU 10 controls the system on the basis of a system program and an application program which are stored in a ROM 11 and a RAM 12, respectively. The RAM 12 is backed up at all times by the battery power source.

Reference numeral 13 is a VRAM (Video RAM) which develops into a dot pattern various data produced by the aforementioned programs and stores therein display data correspondingly to a display screen of the liquid crystal display unit 3.

Reference numeral 14 is a floppy disc drive unit. The keyboard 2 is further provided with a SET-UP key, a SPACE key and a CURSOR key as the keys related to the present invention for setting operating conditions for the computer system.

The liquid crystal display unit 3 is a large-sized one of a large number of dot segments and is provided with a back light of an EL panel, a cold cathode ray tube or the like.

Reference numeral 17 is a parallel interface unit, to which the printer 6 is connected, for performing interface control. The parallel interface unit 17 may be replaced by a serial interface as occasion demands.

Reference numeral 18 is a CRT adapter unit which is capable of changing a colored screen to a monochromatic one or the latter to the former by virtue of unit replacement. Adapter unit 18 is the unit for converting digital data produced by the computer system into video signals, for example, composite signals.

Reference numeral 19 is a MODEM unit which is connected to a telephone circuit and may be replaced through unit replacement by an SIO (serial I/O) for connecting an external MODEM.

Reference numeral 20 is a power unit containing therein a battery circuit and an AC power supply circuit. The CPU 10 controls the switching of DC supply lines 13, 14 and 15 connecting the power unit 20 with the parallel interface unit 17, the CRT adapter unit 18 and the MODEM 19, respectively. The power unit 20 supplies the above described circuit units with DC power through a DC supply line 12. RAM 12 is always supplied with DC power irrespective of the condition of a power switch.

11 is a bus line for executing data interchange between the CPU 10 and the other units.

Figure 3:
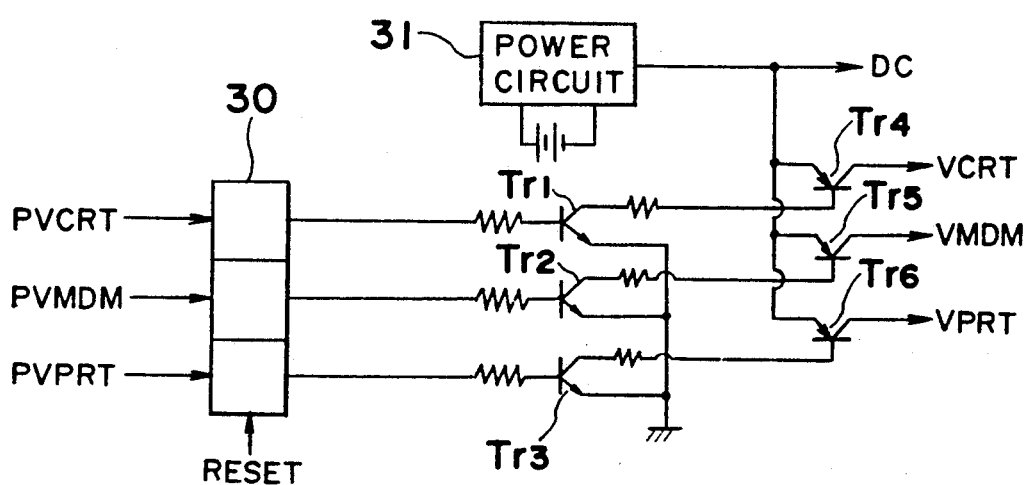
FIG. 3 is a circuit diagram of a switching circuit provided in a power unit of the system of FIG. 1.

FIG. 3 depicts a switching circuit provided in the power unit 20. A latch circuit 30 holds the condition of switching control signals PVCRT, PVMDM and PVPRT supplied from the CPU 10 and is reset by a reset signal at the time of initialization. Output terminals of the latch circuit 30 are connected to base terminals of switching transistors Tr1 to Tr3, which are further connected to base terminals of switching transistors Tr4 to Tr6. Upon turning on these transistors Tr4 to Tr6, the DC voltage is supplied to the CRT adapter 18, the MODEM 19 and the parallel interface 17, until the latch circuit 30 is reset or turned off.

Reference numeral 31 is a power circuit provided with the battery, which is charged by an AC power source and outputs a DC voltage.

Figure 4:
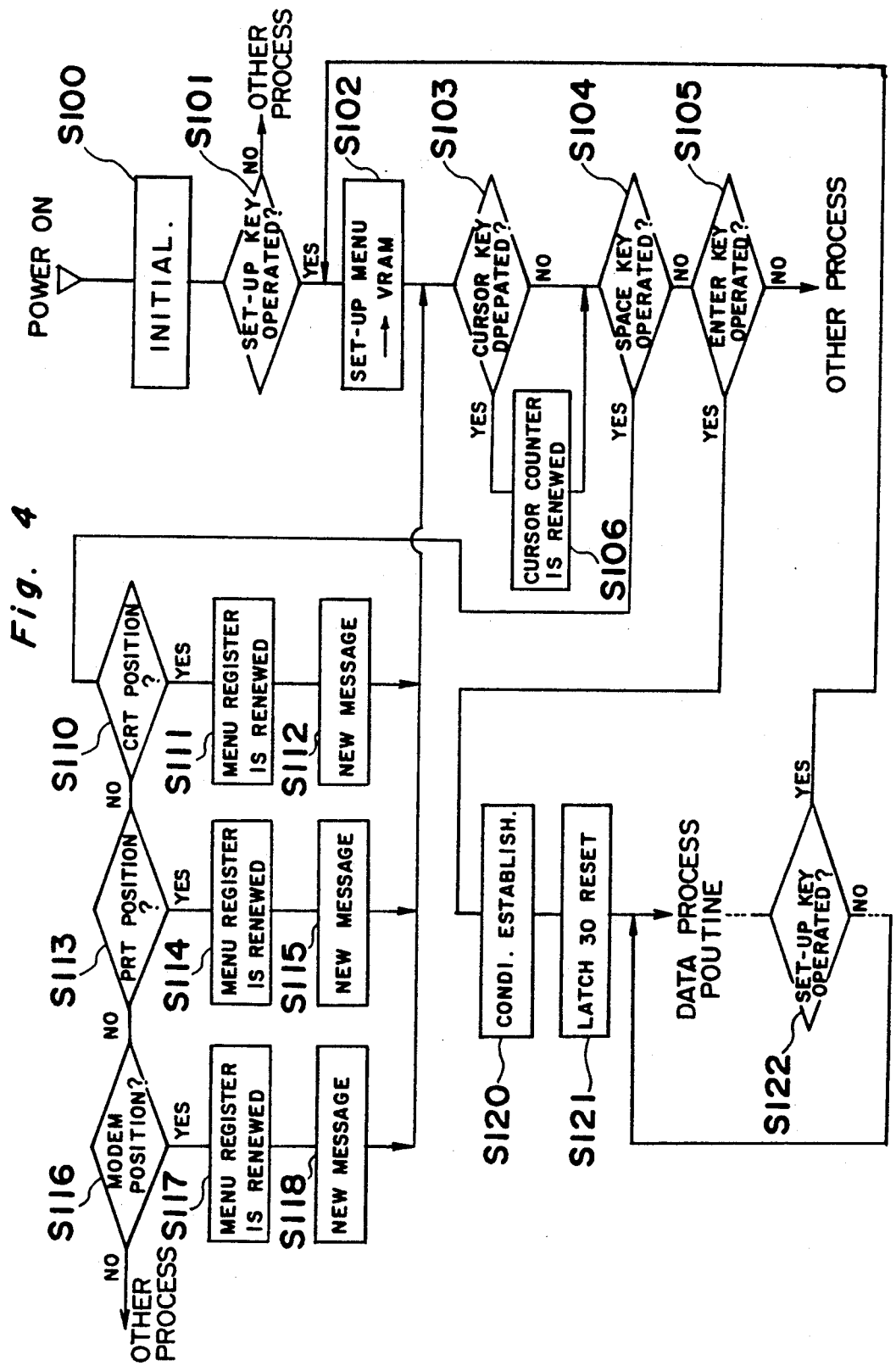
FIG. 4 is a flow-chart showing the processing in the system of FIG. 1.

With reference to FIG. 3 and a flow-chart of FIG. 4, the system operation will be explained hereinafter.

When the computer body 1 is turned on, the system is set to the initial condition at step s100 on the basis of an initialization processing program previously stored in the ROM 11 and an OS (operating system) program is commenced. Such a condition enables the user program to start or to be formed. In this event, an operator operates the SET-UP key provided on the keyboard 2 to set the operating conditions of the computer body 1 and other devices (step s101).

When any key, other than key, set-up is operated, the system executes the processing corresponding to the key which has been operated. Upon operation of the SET-UP key, the procedure proceeds to step s102 at which SET-UP menu data are produced on the basis of the system program of the ROM 11 and are developed into a certain dot pattern to be stored in the VRAM 13. The data stored in the VRAM 13 are displayed on the liquid crystal display unit 16.

Setting items of each condition are stored in the RAM 12. These items are decided definitely and displayed as shown in FIG. 5.

Figure 5:
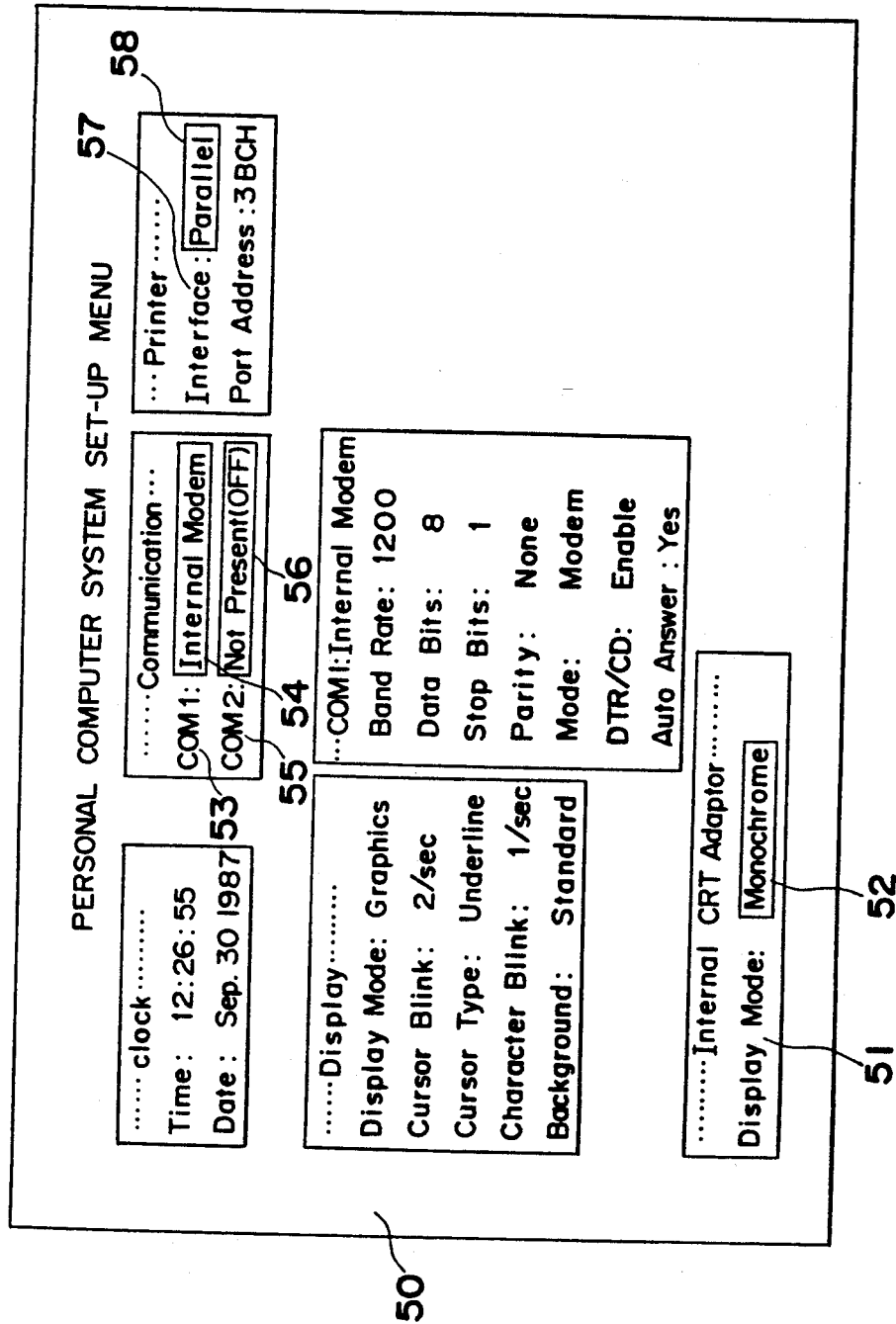
FIG. 5 is a view showing an example of the display of SET-UP menu data information.

In FIG. 5, the names of the setting items are displayed on the left side and those of newly set condition are displayed on the right side. For example, when time is newly set, an item name "Time" is initially selected using the CURSOR key. The time is then newly set by inputting appropriate condition using the numeral keys and the like. The item names related to the present invention are designated by the reference numerals 51, 53, 55 and 57.

Whenever the CURSOR key is operated at step s103, a cursor counter provided in the RAM 12 is renewed at step s106 and the cursor is set on each of the item names.

When the cursor is positioned at "Display Mode 51", the operator can set any one of a monochrome mode, a color mode or an off mode in which the display 5 is not used.

When the cursor is set on "COM1 53" or "COM2 55" related to the MODEM, the operator can select any one of an internal MODEM, an SIO for application of an external MODEM or an off mode.

Furthermore, when the cursor is set on "Interface 57", and one of a "Parallel" mode, a "Serial" mode or an off mode can be set.

If each control unit is not accommodated in the computer body 1, the aforementioned three items are automatically set.

Subsequent to such CURSOR key operations, upon operation of the SPACE key at step s104, the conditions 1 to 3 are changed according to the number of key operations.

More specifically, steps s110 to s112, steps s113 to s115 or steps s116 to s118 are processed so that each menu register may be renewed. The aforementioned messages 1 to 3 are then read out in compliance with the register, and are changed and displayed. At the time of completion of the condition establishment, the operator operates an "ENTER" key provided on the keyboard 2 at step s105.

At step s120, the contents of each register are stored in an area for condition establishment which has been determined in advance in the RAM 12.

If the setting condition is other than the off mode, the signals PVCRT, PVMDM and PVPRT are supplied to the latch circuit 30 to reset it at step s121, thereby turning on or off the transistors Tr1 to Tr6 to switch the power supply to each control unit. The above processes are followed by a data processing routine in which these processes are again performed upon operation of the SET-UP key at step s122.

As described above, the peripheral device or devices to be used are selected on the basis of the SET-UP menu at the time the computer system is powered on. This selection initiates the power supply to the desired devices, thus resulting in effective use of the battery power source.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of controlling power to a plurality of peripheral devices connected to a personal computer system the computer system including a battery driven computer body, said method comprising the steps of:
   (a) displaying a set up menu which includes a peripheral device selection portion by a user actuating a set-up key on a key board, said menu displaying information including the operating conditions of said peripheral device;
   (b) selecting any of the peripheral devices for operation by a user actuating said device selecting portion by actuating cursor key so that a cursor indicates a peripheral device on the display and electrical power can be supplied only to the selected peripheral device; and (c) supplying electrical power to only the selected peripheral device through interface units in the computer body.

2. The method according to claim 1, wherein said device selection is made after the system has been powered on, prior to data processing.

3. A method of controlling power to a plurality of peripheral devices in a computer system which includes a battery driven computer body, to which the plurality of peripheral devices can be connected thereto, said method comprising the steps of:

(a) displaying set up menu information on said computer body so that operating conditions of said devices can be set by a user actuating a set-up key on a key board, said displaying set up menu including a device selection portion;

(b) selecting any of said devices with said device selection portion by a user actuating a cursor key so that a cursor indicates a peripheral device on the display;

(c) supplying electric power to a control circuit in said computer body; and (d) supplying said electric power through said control circuit to interface units in the computer body only to said selected devices.

4. The method according to claim 3, wherein said device selection is executed at the time of initial setting after the system has been powered on.

5. The method according to claim 3, wherein the step of selecting is performed with the use of a keyboard.

6. The method according to claim 3, wherein the step of selecting is performed using software processing.

7. A method of controlling power delivered to a plurality of peripheral devices of a personal computer system that includes a battery driven personal computer body, said method comprising the steps of:

(a) displaying a set up menu on a display of the personal computer body by a suer actuating a set-up key on a key board, the set up menu including a peripheral device selection portion and the operating conditions of the peripheral device;

(b) selecting any of the peripheral devices for operation by a user, by actuating said device selecting portion by a user actuating a cursor key so that a cursor indicates a peripheral device on the display so that electrical power can be supplied only to the selected peripheral device; and (c) supplying electrical power to only the selected peripheral device through interface units in the personal computer body.

8. The method of claim 7 wherein said peripheral devices are selected from the group consisting of a CRT or printer and actuating an AC power supply for supplying electrical power for use by the peripheral devices.

* * * * *